US012603727B2

(12) United States Patent
Yuan et al.

(10) Patent No.: US 12,603,727 B2
(45) Date of Patent: Apr. 14, 2026

(54) PUSCH REPETITION BASED AT LEAST IN PART ON A SYMBOL OFFSET

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/759,582

(22) PCT Filed: Feb. 28, 2020

(86) PCT No.: PCT/CN2020/077060
§ 371 (c)(1),
(2) Date: Jul. 27, 2022

(87) PCT Pub. No.: WO2021/168762
PCT Pub. Date: Sep. 2, 2021

(65) Prior Publication Data
US 2023/0062024 A1     Mar. 2, 2023

(51) Int. Cl.
*H04L 1/08*          (2006.01)
*H04L 1/1867*        (2023.01)

(52) U.S. Cl.
CPC .............. *H04L 1/08* (2013.01); *H04L 1/1887* (2013.01)

(58) Field of Classification Search
None
See application file for complete search history.

(56) References Cited

U.S. PATENT DOCUMENTS 10,142,074 B2    11/2018  Wang et al.
2016/0143017 A1   5/2016  Yang et al.
(Continued)

FOREIGN PATENT DOCUMENTS

CN      110719650 A    1/2020
EP       3996315 A1    5/2022
(Continued)

OTHER PUBLICATIONS

VIVO: "Discussion on the Enhancements to Configured Grants", 3GPP TSG RAN WG1 #98bis, R1-1910207, Oct. 4, 2019 sections 2-3, 9 pages. (Year: 2019).*
(Continued)

*Primary Examiner* — Benjamin Lamont
(74) *Attorney, Agent, or Firm* — Harrity & Harrity, LLP

(57) ABSTRACT

Various aspects of the present disclosure generally relate to wireless communication. In some aspects, a user equipment (UE) may determine, based at least in part on a first symbol offset, a starting symbol and an ending symbol for a first repetition of a plurality of repetitions of a physical uplink shared channel (PUSCH) transmission. The UE may determine, based at least in part on a second symbol offset, a starting symbol and an ending symbol for a second repetition of the plurality of repetitions of the PUSCH transmission. Numerous other aspects are provided.

19 Claims, 6 Drawing Sheets

(56)                References Cited

U.S. PATENT DOCUMENTS

| | | | |
|---|---|---|---|
| 2018/0123747 A1* | 5/2018 | Wang .................... | H04L 5/0053 |
| 2019/0053211 A1 | 2/2019 | Ying et al. | |
| 2019/0230689 A1 | 7/2019 | Cao et al. | |
| 2019/0313436 A1 | 10/2019 | Lee et al. | |
| 2020/0162208 A1* | 5/2020 | Moon .................... | H04L 1/1893 |
| 2021/0203397 A1* | 7/2021 | Xiong ................. | H04W 72/046 |
| 2021/0282137 A1* | 9/2021 | Wang .................... | H04L 5/0055 |
| 2021/0314982 A1* | 10/2021 | Panteleev ............. | H04L 5/0053 |
| 2022/0104224 A1* | 3/2022 | Choi ................. | H04W 72/1268 |
| 2022/0167352 A1* | 5/2022 | Bhamri ................. | H04W 72/23 |
| 2023/0072427 A1* | 3/2023 | Jung .................... | H04B 7/0617 |

FOREIGN PATENT DOCUMENTS

| | | |
|---|---|---|
| WO | 2018084917 | 5/2018 |
| WO | 2020033785 A1 | 2/2020 |

OTHER PUBLICATIONS

Ericsson: "Configured Grant Enhancement", 3GPP TSG RAN WG1 meeting #98bis, R1-1910950, Oct. 21, 2019 (Oct. 21, 2019), 7 pages, the whole document.

International Search Report and Written Opinion—PCT/CN2020/077060—ISA/EPO—Nov. 30, 2020.

Qualcomm Incorporated: "Enhancement to Configured Grants in NR Unlicensed", 3GPP TSG RAN WG1 Meeting #99, Reno, USA, Nov. 18, 2019-Nov. 22, 2019, R1-1912941, Nov. 22, 2019 (Nov. 22, 2019), 12 Pages, the whole document.

Sony: "Enhancements to Configured Grants in NR-U", 3GPP TSG RAN WG1 meeting #98bis, R1-1910762, Oct. 20, 2019 (Oct. 20, 2019), 8 pages, the whole document.

VIVO: "Discussion on the Enhancements to Configured Grants", 3GPP TSG RAN WG1 #98bis, R1-1910207, Oct. 4, 2019 (Oct. 4, 2019) sections 2-3, 9 pages.

ETRI: "Potential Enhancements to PUSCH", 3GPP TSG RAN WG1 #96, R1-1902443, Potential Enhancements to PUSCH—Final, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600139, 8 Pages, pp. 2-4, figures 1(a)-3.

NTT Docomo Inc:"UL Data Transmission Procedure", 3GPP TSG RAN WG1 Meeting #92, R1-1802488, 3rd Generation Partnership Project, Mobile Competence Centre, 650, Route Des Lucioles, F-06921 Sophia-antipolis Cedex, France, vol. RAN WG1, No. Athens, Greece, Feb. 26, 2018-Mar. 2, 2018, Feb. 17, 2018, pp. 1-12, XP051397994, pp. 5-7.

Supplementary European Search Report—EP20921284—Search Authority—The Hague—Oct. 30, 2023.

ETRI: "Potential Enhancements to PUSCH", 3GPP TSG RAN WG1 #96, R1-1902443, Athens, Greece, Feb. 25, 2019-Mar. 1, 2019, Mar. 1, 2019, pp. 1-8, Sections 1-3.

Qualcomm Incorporated: "PUSCH Enhancements for eURLLC", R1-1903006, 3GPP TSG-RAN WG1 #96, 3rd Generation Partnership Project, vol. RAN WG1, No. Athens, Greece, Feb. 25, 2019-Mar. 1, 2019, Feb. 16, 2019, 6 Pages.

* cited by examiner

FIG. 3B

Determine, based at least in part on a first symbol offset, a starting symbol and an ending symbol for a first repetition of a plurality of repetitions of a PUSCH transmission Determine, based at least in part on a second symbol offset, a starting symbol and an ending symbol for a second repetition of the plurality of repetitions of the PUSCH transmission

410

420

400

PUSCH REPETITION BASED AT LEAST IN PART ON A SYMBOL OFFSET

CROSS-REFERENCE TO RELATED APPLICATION

This application is a 371 national stage of Patent Cooperation Treaty (PCT) Application No. PCT/CN2020/077060 filed on Feb. 28, 2020, entitled "PUSCH REPETITIONS BASED AT LEAST IN PART ON A SYMBOL OFFSET," which is hereby expressly incorporated by reference herein.

FIELD OF THE DISCLOSURE

Aspects of the present disclosure generally relate to wireless communication and to techniques and apparatuses for transmitting physical uplink shared channel (PUSCH) repetitions based at least in part on a symbol offset.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, based at least in part on a first symbol offset, a starting symbol and an ending symbol for a first repetition of a plurality of repetitions of a physical uplink shared channel (PUSCH) transmission; and determining, based at least in part on a second symbol offset, a starting symbol and an ending symbol for a second repetition of the plurality of repetitions of the PUSCH transmission.

In some aspects, a UE for wireless communication may include a memory and one or more processors operatively coupled to the memory. The memory and the one or more processors may be configured to determine, based at least in part on a first symbol offset, a starting symbol and an ending symbol for a first repetition of a plurality of repetitions of a PUSCH transmission; and determine, based at least in part on a second symbol offset, a starting symbol and an ending symbol for a second repetition of the plurality of repetitions of the PUSCH transmission.

In some aspects, a non-transitory computer-readable medium may store one or more instructions for wireless communication. The one or more instructions, when executed by one or more processors of a UE, may cause the one or more processors to determine, based at least in part on a first symbol offset, a starting symbol and an ending symbol for a first repetition of a plurality of repetitions of a PUSCH transmission; and determine, based at least in part on a second symbol offset, a starting symbol and an ending symbol for a second repetition of the plurality of repetitions of the PUSCH transmission.

In some aspects, an apparatus for wireless communication may include means for determining, based at least in part on a first symbol offset, a starting symbol and an ending symbol for a first repetition of a plurality of repetitions of a PUSCH transmission; and means for determining, based at least in part on a second symbol offset, a starting symbol and an ending symbol for a second repetition of the plurality of repetitions of the PUSCH transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating one or more examples of transmitting physical uplink shared channel (PUSCH) repetitions based at least in part on a symbol offset, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
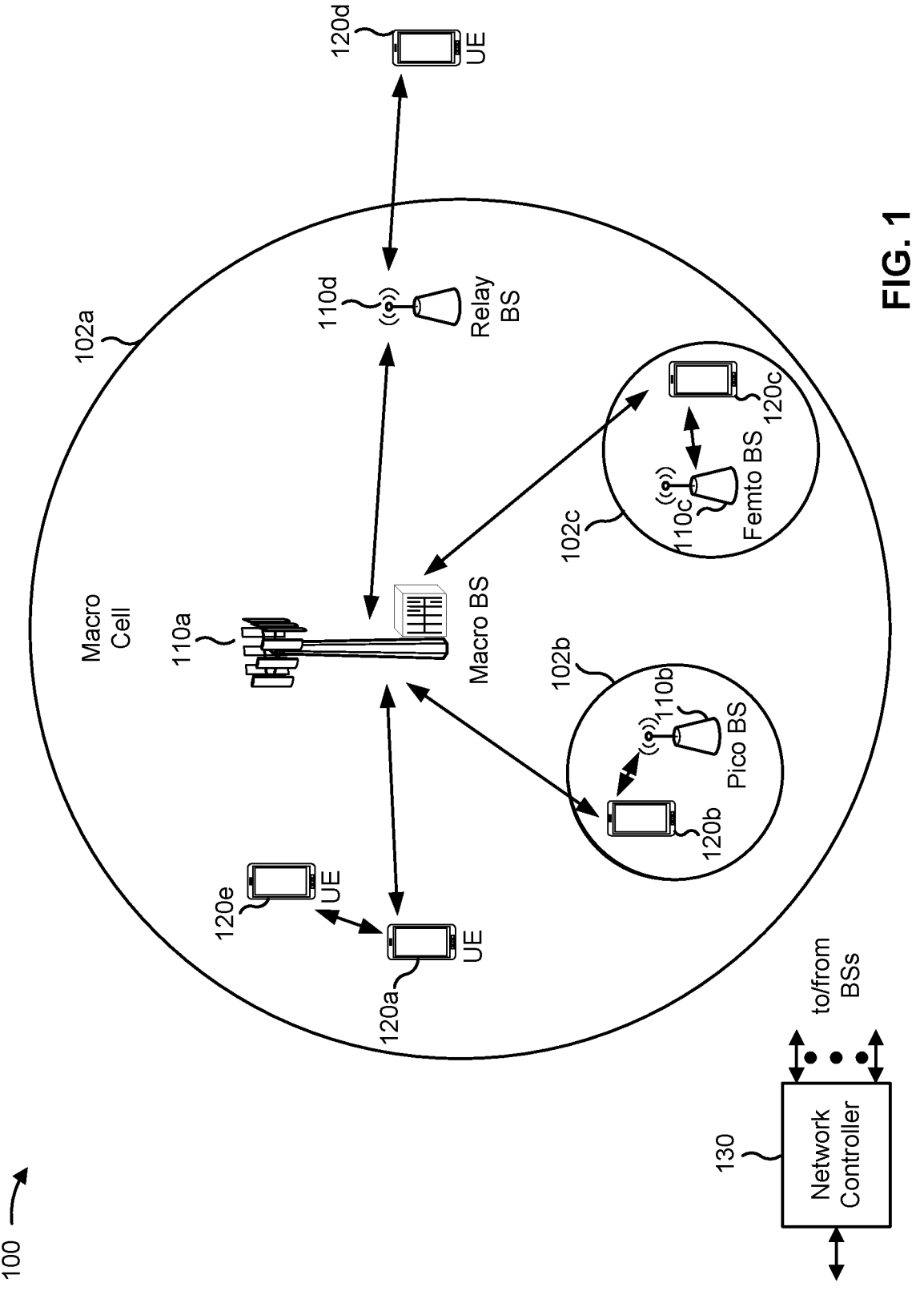
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station

110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
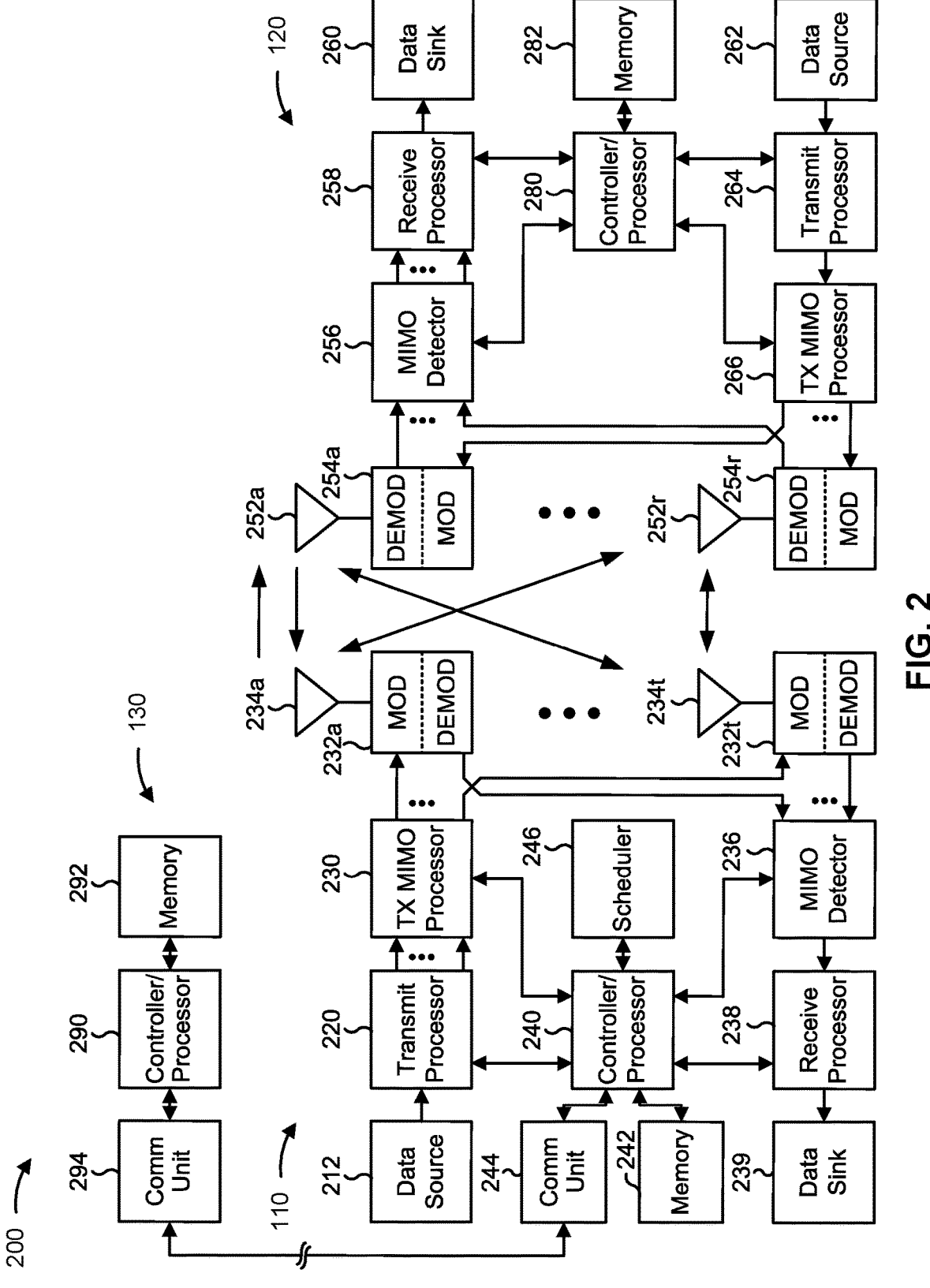
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting physical uplink shared channel (PUSCH) repetitions based at least in part on a symbol offset, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining, based at least in part on a first symbol offset, a starting symbol and an ending symbol for a first repetition of a plurality of repetitions of a PUSCH transmission, means for determining, based at least in part on a second symbol offset, a starting symbol and an ending symbol for a second repetition of the plurality of repetitions of the PUSCH transmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may be configured to transmit a plurality of repetitions of a PUSCH transmission. Each repetition may repeat the PUSCH transmission for various purposes, including to increase the reliability of the PUSCH transmission, to increase transmit diversity of the PUSCH transmission, and/or the like. In some cases, a UE is configured to transmit repetitions of a PUSCH transmission using beam sweeping or antenna panel sweeping. In these cases, the UE transmits one or more repetitions of the PUSCH transmission on a first beam or first antenna panel (or first antenna), one or more repetitions of the PUSCH transmission on a second beam or second antenna panel (or second antenna), and so on.

To transmit repetitions of a PUSCH transmission on different beams or antenna panels, the UE may perform beam switching or panel switching to switch between the different beams or different antenna panels. This permits the UE to transmit subsets of repetitions of the PUSCH transmission in an alternating manner. For example, the UE may transmit a first subset of repetitions of the PUSCH transmission on a first beam or antenna panel, switch to a second beam or second antenna panel, transmit a second subset of repetitions of the PUSCH transmission on the second beam or second antenna panel, switch to the first beam or first antenna panel, transmit a third subset of repetitions of the PUSCH transmission on the first beam or first antenna panel, and so on. However, the UE needs time to perform beam switching or antenna panel switching between transmitting repetitions of the PUSCH transmission on different beams. If the amount of time between repetitions is not sufficient, the UE may need to puncture one or both repetitions to perform beam switching, which decreases the reliability of transmitting the PUSCH transmission with repetition, increases the likelihood of retransmissions for the PUSCH transmission, and/or the like.

Some aspects described herein provide techniques and apparatuses for transmitting PUSCH repetitions based at least in part on a symbol offset. In some aspects, a UE 120 may determine a respective starting symbol and a respective ending symbol for each repetition of a PUSCH transmission based at least in part on a symbol offset between repetitions of the PUSCH transmission. The symbol offset may be the same for all repetitions or may be variable and configurable for each repetition. In this way, the symbol offset(s) provide the UE 120 with sufficient time to perform beam switching or antenna panel switching between repetitions of the PUSCH transmission, which increases the reliability of transmitting the PUSCH transmission with repetition, decreases the likelihood of retransmissions for the PUSCH transmission, and/or the like.

Figure 3A:
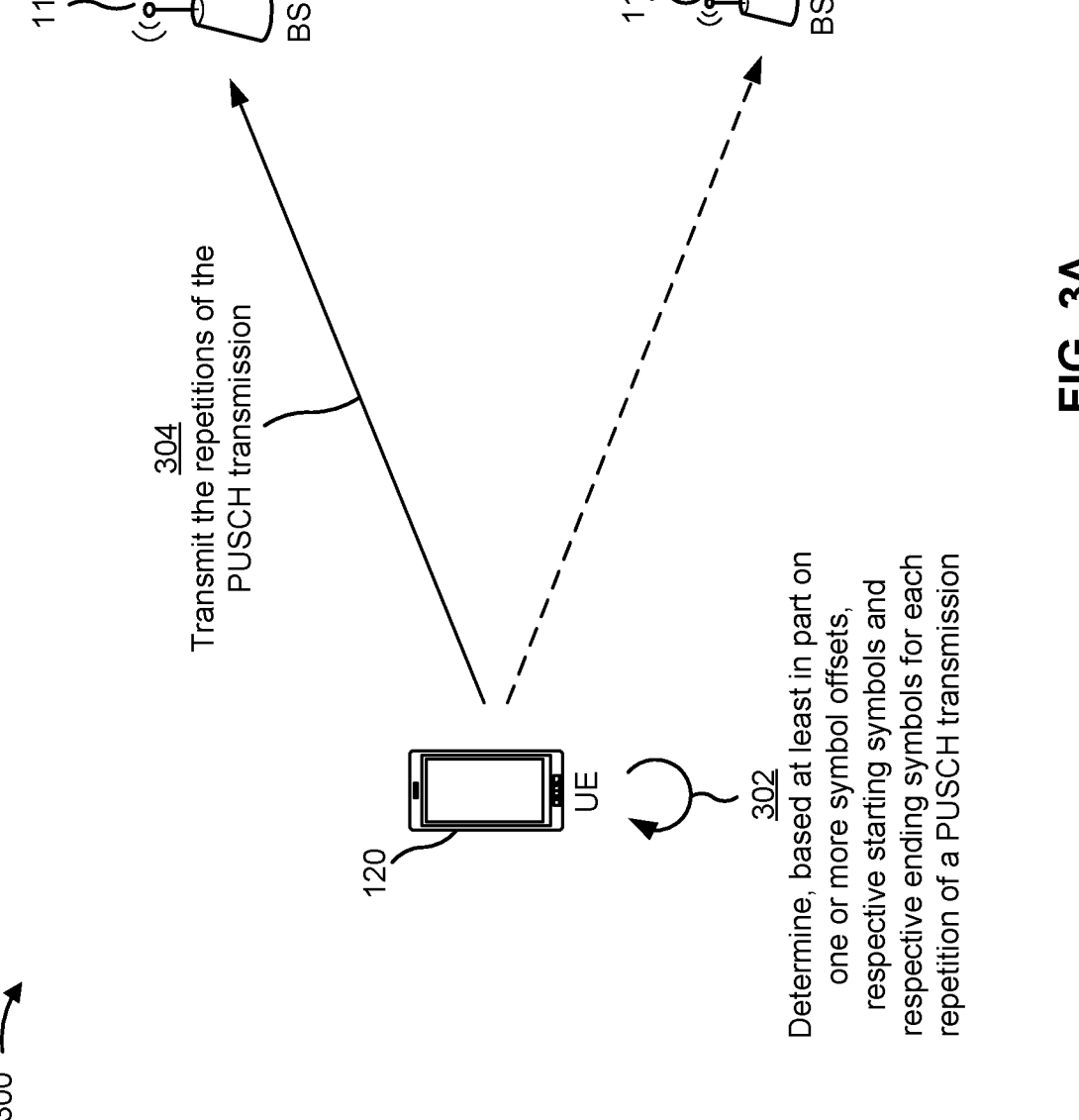
Figure 3B:
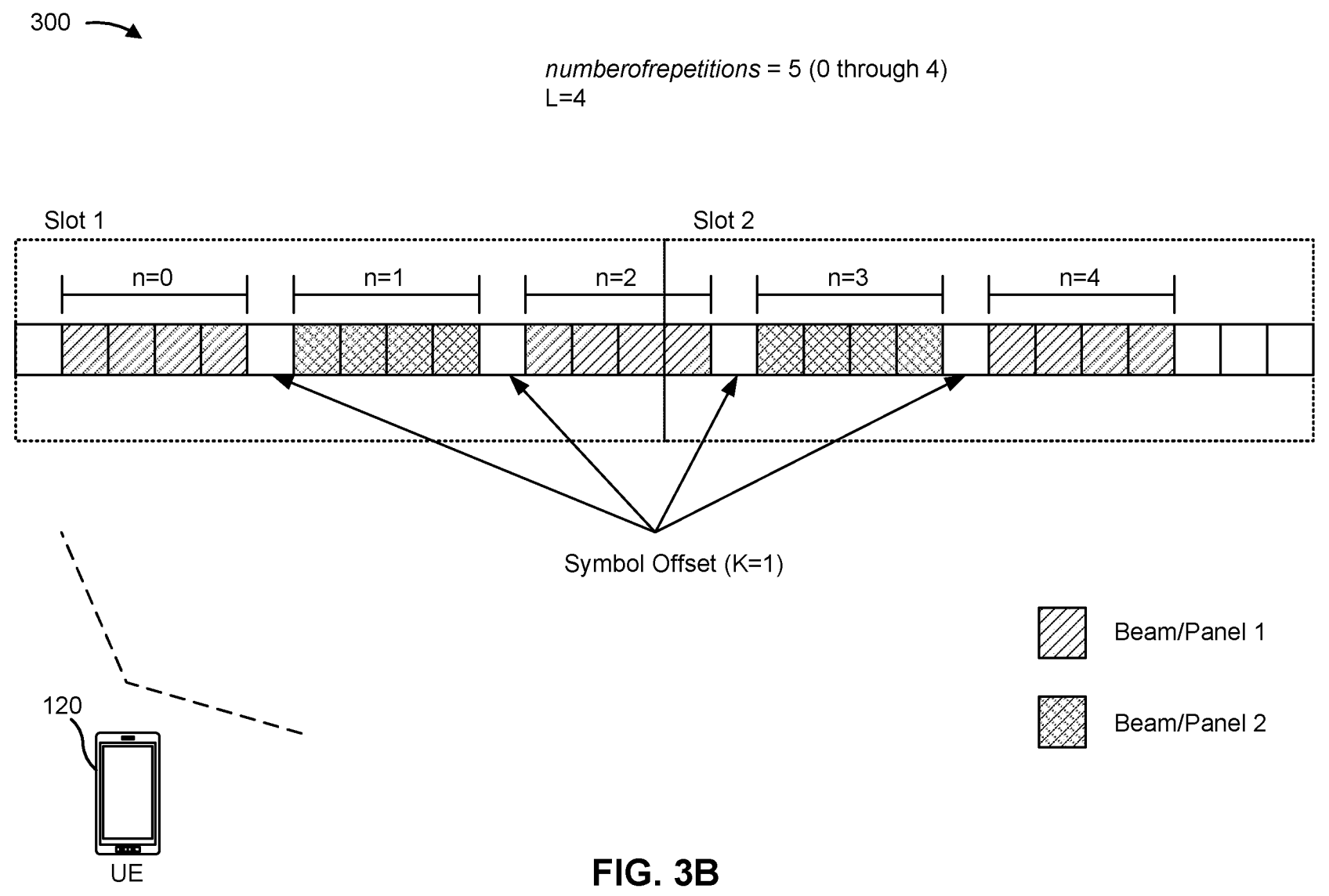
Figure 3C:
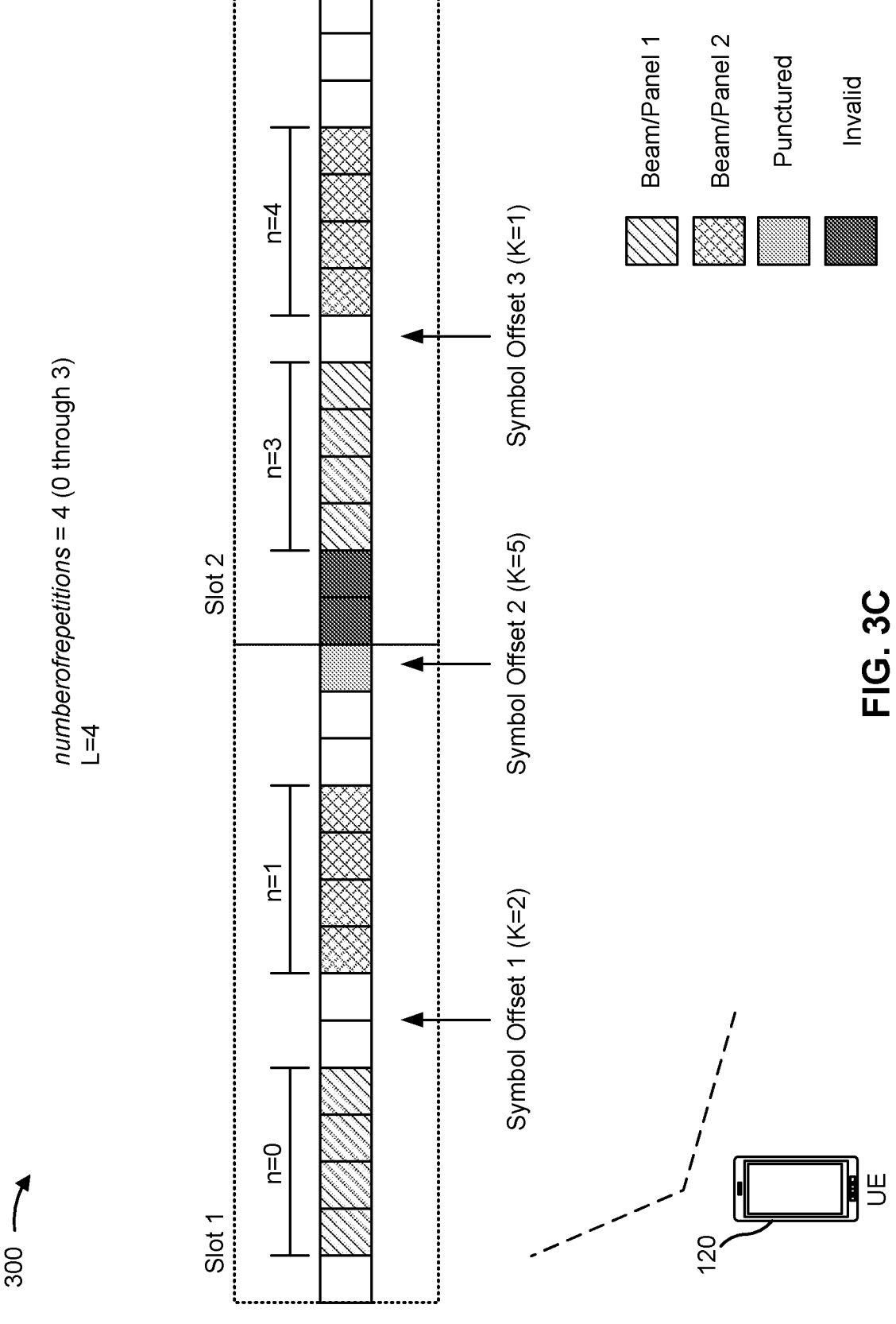

FIGS. 3A-3C are diagrams illustrating one or more examples 300 of transmitting PUSCH repetitions based at least in part on a symbol offset, in accordance with various aspects of the present disclosure. As shown in FIG. 3A, example(s) 300 include communication between a UE 120 and one or more base stations 110 (e.g., BS 1, BS 2, and/or the like). The UE 120 and the one or more base stations 110 may be included in a wireless network, such as wireless network 100. The UE 120 and the one or more base stations 110 may communicate via a wireless access link, which may include an uplink and a downlink.

In some aspects, the UE 120 is configured to transmit a plurality of repetitions of a PUSCH transmission or another type of uplink transmission to at least one of the one or more base stations 110. For example, the UE 120 may be configured to transmit one or more repetitions of a PUSCH transmission on a first beam or a first antenna panel to BS 1 and one or more repetitions of the PUSCH transmission on a second beam or second antenna panel to BS 2, and so on. As another example, UE 120 may be configured to transmit one or more repetitions of a PUSCH transmission on a first beam or a first antenna panel to BS 1 and one or more repetitions of the PUSCH transmission on a second beam or second antenna panel to BS 1, and so on.

As shown in FIG. 3A, and by reference number 302, the UE 120 may determine respective starting symbols and respective ending symbols for each repetition of the PUSCH transmission. The starting symbol and ending symbol can be used for determining a duration of a nominal PUSCH repetition. For a PUSCH repetition actually transmitted within a duration of a nominal PUSCH repetition, the starting and ending symbols can be further based on other factors, such as invalid uplink symbols. For example, the UE 120 may determine a starting symbol and an ending symbol for a first repetition of the PUSCH transmission, may determine a starting symbol and an ending symbol for a second repetition of the PUSCH transmission, and so on.

As further shown by reference number 302, the UE 120 may determine respective starting symbols and respective ending symbols for each repetition of the PUSCH transmission based at least in part on one or more symbol offsets. A symbol offset may indicate a quantity of unused symbols (or symbols in which no uplink transmission is to occur) between two consecutive and/or adjacent repetitions. For example, a symbol offset may indicate that two unused symbols are included between a first repetition and a second repetition.

In some aspects, the symbol offsets for all repetitions of the PUSCH transmission are the same symbol offset value (e.g., one unused symbol between each consecutive and/or adjacent repetition). In some aspects, at least a subset of symbol offsets are different symbol offset values (e.g., a first symbol offset between two repetitions may be one symbol and a second symbol offset between another two repetitions may be three symbols). In some aspects, the one or more symbol offsets are configured to be fixed symbol offset values. In some aspects, at least a subset of the symbol offsets are configured to be variable or flexible symbol offset values. A variable or flexible symbol offset value may be dynamically indicated via downlink control information (DCI) or medium access control control element (MAC-CE) signaling, such as in a downlink communication that schedules the PUSCH transmission. In some aspects, the one or more symbol offsets may be configured to include a combination of same symbol offset values, different symbol offset values, fixed symbol offset values, and/or variable symbol offset values.

In some aspects, a base station 110 that schedules the PUSCH transmission indicates the one or more offset values to the UE 120 in downlink signaling (e.g., in DCI or MAC-CE signaling, in a radio resource control (RRC) configuration, and/or the like). In some aspects, the one or more offset values are configured and stored at the UE 120 (e.g., in a memory 282 and/or another data store) without the use of downlink signaling. In these cases, the one or more offset values may be defined in a wireless communication standard, a specification, a table, an electronic file, and/or the like.

To determine a starting symbol and the ending symbol for a repetition of the PUSCH transmission, the UE 120 may determine a starting slot and an ending slot for the repetition, and may determine the location of the starting symbol in the starting slot and the location of the ending symbol in the ending slot. The UE 120 may determine the respective starting slots and starting symbols, and the respective ending slots and ending symbols, for each repetition of the PUSCH transmission based at least in part on other parameters, such as a nominal duration for each repetition, a slot number or slot index of the starting slot for the PUSCH transmission, a quantity of symbols included in each slot in which the PUSCH transmission is to be transmitted, a starting symbol for the PUSCH transmission in the starting slot for the PUSCH transmission, a repetition index associated with each repetition, and/or the like.

The actual duration for a repetition may be the same as or different from the scheduled nominal duration of the repetition. The actual duration for a repetition may be shorter (e.g., may include fewer symbols) than the scheduled nominal duration of the repetition in cases where the repetition is punctured (e.g., one or more of the symbols of the repetition are dropped and/or not transmitted), in cases where one or more of the scheduled symbols of the repetition are invalid uplink symbols (e.g., are not permitted to be used as uplink symbols, are not permitted to be used for the particular type of uplink transmission as the repetition, and/or the like), and/or the like.

The starting symbol for the PUSCH transmission may correspond to the first scheduled symbol of the PUSCH transmission, which may be the first symbol or starting symbol of the first repetition of the PUSCH transmission. The repetition index associated with a repetition may refer to the index of the repetition within the sequence of repetitions to be transmitted for the PUSCH transmission. For example, if 3 repetitions are scheduled to be transmitted for the PUSCH transmission, the repetition index of the first repetition may be 0, the repetition index of the second repetition may be 1, and the repetition index of the third repetition may be 2.

In cases where the one or more symbol offsets are fixed and have the same symbol offset value, the UE 120 may determine the starting slot for a repetition of the PUSCH transmission based at least in part on Equation 1:

$$kstart_n = K_s + \left\lfloor \frac{S + n * (L + K)}{N_{symb}^{slot}} \right\rfloor \qquad \text{Equation 1}$$

where $kstart_n$ is the starting slot for the nth repetition of the PUSCH transmission, n is the repetition index of the nth repetition, $K_s$ is the starting slot for the PUSCH transmission, S is the starting symbol relative to the starting slot, L is the nominal duration of the nth repetition, K is the symbol offset value for the one or more symbol offsets, and $$N_{symb}^{slot}$$

is the quantity of symbols in each slot in which the PUSCH transmission is transmitted. For example, the value of $K_s$, S and L can be derived based on the indication of the DCI field of time domain resource assignment, e.g., the slot offset K2 and starting and length indicator value (SLIV).

In cases where the one or more symbol offsets are fixed and have the same symbol offset value, the UE 120 may determine the starting symbol for a repetition of the PUSCH transmission based at least in part on Equation 2:

$$sstart_n = \text{mod}\left(S + n*(L + K),\ N_{symb}^{slot}\right) \qquad \text{Equation 2}$$

where $sstart_n$ is the location (e.g., the symbol index) of the starting symbol for the nth repetition of the PUSCH transmission in slot $kstart_n$.

In cases where the one or more symbol offsets are fixed and have the same symbol offset value, the UE 120 may determine the ending slot for a repetition of the PUSCH transmission based at least in part on Equation 3:

$$kend_n = K_s + \left\lfloor \frac{S + (n+1)*L + n*K - 1}{N_{symb}^{slot}} \right\rfloor \qquad \text{Equation 3}$$

where $kend_n$ is the ending slot for the nth repetition of the PUSCH transmission.

In cases where the one or more symbol offsets are fixed and have the same symbol offset value, the UE 120 may determine the ending symbol for a repetition of the PUSCH transmission based at least in part on Equation 4:

$$send_n = \text{mod}\left(S + (n+1)*L + n*K - 1,\ N_{symb}^{slot}\right) \qquad \text{Equation 4}$$

where $send_n$ is the location (e.g., the symbol index) of the ending symbol for the nth repetition of the PUSCH transmission in slot $kend_n$.

In cases where the one or more symbol offsets are variable or have flexible symbol offset values, the UE 120 may determine the starting slot for a repetition of the PUSCH transmission based at least in part on Equation 5:

$$kstart_n = K_s + \left\lfloor \frac{S + n*L + \sum_{i=0}^{n} K_i}{N_{symb}^{slot}} \right\rfloor \qquad \text{Equation 5}$$

where $kstart_n$ is the starting slot for the nth repetition of the PUSCH transmission, n is the repetition index of the nth repetition, $K_s$ is the starting slot for the PUSCH transmission, L is the nominal duration of the nth repetition, K is the symbol offset value for the one or more symbol offsets, and $$N_{symb}^{slot}$$

is the quantity of symbols in each slot in which the PUSCH transmission is transmitted. Thus, according to Equation 5, the UE 120 may determine $kstart_n$ for the nth repetition of the PUSCH transmission based at least in part on an accumulation or a summation of the symbol offsets from the first repetition (n=0) to the nth repetition. The $K_n$ means the symbol offset between the repetition index n−1 and repetition index n, and $K_0$=0. In cases where the one or more symbol offsets are variable or have flexible symbol offset values, the UE 120 may determine the starting symbol for a repetition of the PUSCH transmission based at least in part on Equation 6:

$$sstart_n = \text{mod}\left(S + n*L + \sum_{i=0}^{n} K_i,\ N_{symb}^{slot}\right) \qquad \text{Equation 6}$$

where $sstart_n$ is the location (e.g., the symbol index) of the starting symbol for the nth repetition of the PUSCH transmission in slot $kstart_n$. Thus, according to Equation 6, the UE 120 may determine $sstart_n$ for the nth repetition of the PUSCH transmission based at least in part on an accumulation or a summation of the symbol offsets from the first repetition (n=0) to the nth repetition.

In cases where the one or more symbol offsets are variable or have flexible symbol offset values, the UE 120 may determine the ending slot for a repetition of the PUSCH transmission based at least in part on Equation 7:

$$kend_n = K_s + \left\lfloor \frac{S + (n+1)*L + \sum_{i=0}^{n} K_i - 1}{N_{symb}^{slot}} \right\rfloor \qquad \text{Equation 7}$$

where $kend_n$ is the ending slot for the nth repetition of the PUSCH transmission. Thus, according to Equation 7, the UE 120 may determine $kend_n$ for the nth repetition of the PUSCH transmission based at least in part on an accumulation or a summation of the symbol offsets from the first repetition (n=0) to the nth repetition.

In cases where the one or more symbol offsets are variable or have flexible symbol offset values, the UE 120 may determine the ending symbol for a repetition of the PUSCH transmission based at least in part on Equation 8:

$$send_n = \text{mod}\left(S + (n+1)*L + \sum_{i=0}^{n} K_i - 1,\ N_{symb}^{slot}\right) \qquad \text{Equation 8}$$

where $send_n$ is the location (e.g., the symbol index) of the ending symbol for the nth repetition of the PUSCH transmission in slot $kend_n$. Thus, according to Equation 8, the UE 120 may determine $send_n$ for the nth repetition of the PUSCH transmission based at least in part on an accumulation or a summation of the symbol offsets from the first repetition (n=0) to the nth repetition.

As further shown in FIG. 3A, and by reference number 304, the UE 120 may transmit the plurality of repetitions of the PUSCH transmission to the one or more base stations 110. For example, the UE 120 may transmit a first repetition from a starting symbol of the first repetition to an ending symbol of the first repetition, may transmit a second repetition from a starting symbol of the second repetition to an ending symbol of the second repetition, and so on. The UE 120 may perform beam switching or antenna panel switching in unused symbols between repetitions, where the unused symbols result from the one or more symbol offsets for the repetitions of the PUSCH transmission.

FIGS. 3B and 3C illustrate some example scenarios in which the UE 120 may determine a respective starting symbol and a respective ending symbol for each repetition of a PUSCH transmission based at least in part on one or more of Equations 1-8 described above. UE 120 may determine a respective starting symbol and a respective ending symbol for each repetition of a PUSCH transmission in other scenarios and/or configurations based at least in part on one or more of Equations 1-8 described above.

FIG. 3B illustrates an example scenario in which the symbol offsets for a plurality of repetitions of PUSCH transmission are fixed and have the same symbol offset value (e.g., K=1). As further illustrated in FIG. 3B, the PUSCH transmission may include 5 repetitions (e.g., numberofrepetitions=5, repetition index n=0 through n=4) that each include 4 symbols (L=4). The PUSCH transmission may span a plurality of slots, may start in slot 1, and may end in slot 2. Each of slot 1 and slot 2 may include 14 symbols, assigned symbol indexes 0-13.

As further illustrated in FIG. 3B, the UE 120 may transmit the plurality of repetitions in an alternating manner, in which a first repetition (n=0) is transmitted on a first beam or a first antenna panel, a second repetition (n=1) is transmitted on a second beam or a second antenna panel, a third repetition (n=2) is transmitted on the first beam or the first antenna panel, a fourth repetition (n=3) is transmitted on the second beam or the second antenna panel, and a fifth repetition (n=4) is transmitted on the first beam or the first antenna panel.

Because the symbol offsets for a plurality of repetitions of PUSCH transmission are fixed and have the same symbol offset value (e.g., K=1), the UE 120 may determine a respective starting slot and starting symbol, and a respective ending slot and ending symbol, for each of repetition n=0 through n=4 based at least in part on Equations 1-4 described above. Accordingly, the UE 120 may determine the starting slot for the first repetition (n=0) as slot 1, and may determine the starting symbol for the first repetition (n=0) as symbol index 1 in slot 1. The UE 120 may determine the ending slot for the first repetition (n=0) as slot 1, and may determine the ending symbol for the first repetition (n=0) as symbol index 4 in slot 1.

The UE 120 may determine the starting slot for the second repetition (n=1) as slot 1, and may determine the starting symbol for the second repetition (n=1) as symbol index 6 in slot 1. The UE 120 may determine the ending slot for the second repetition (n=1) as slot 1, and may determine the ending symbol for the second repetition (n=1) as symbol index 9 in slot 1. The UE 120 may determine the starting slot for the third repetition (n=2) as slot 1, and may determine the starting symbol for the third repetition (n=2) as symbol index 11 in slot 1. The UE 120 may determine the ending slot for the third repetition (n=2) as slot 2, and may determine the ending symbol for the third repetition (n=2) as symbol index 0 in slot 2.

The UE 120 may determine the starting slot for the fourth repetition (n=3) as slot 2, and may determine the starting symbol for the fourth repetition (n=3) as symbol index 2 in slot 2. The UE 120 may determine the ending slot for the fourth repetition (n=3) as slot 2, and may determine the ending symbol for the fourth repetition (n=3) as symbol index 5 in slot 2. The UE 120 may determine the starting slot for the fifth repetition (n=4) as slot 2, and may determine the starting symbol for the fifth repetition (n=4) as symbol index 7 in slot 2. The UE 120 may determine the ending slot for the fifth repetition (n=4) as slot 2, and may determine the ending symbol for the fifth repetition (n=4) as symbol index 10 in slot 2. FIG. 3C illustrates an example scenario in which the symbol offsets for a plurality of repetitions of PUSCH transmission are variable or flexible. As illustrated in FIG. 3C, the PUSCH transmission may include 4 repetitions (e.g., numberofrepetitions=4, repetition index n=0 through n=3) that each include 4 symbols (L=4). The PUSCH transmission may span a plurality of slots, may start in slot 1, and may end in slot 2. Each of slot 1 and slot 2 may include 14 symbols, assigned symbol indexes 0-13.

As further illustrated in FIG. 3C, the symbol offsets between the plurality of repetitions may be indicated as K=2 for symbol offset 1 between the first repetition (n=0) and the second repetition (n=1), K=5 for symbol offset 2 between the second repetition (n=1) and the third repetition (n=2), and K=1 for symbol offset 3 between the third repetition (n=2) and the fourth repetition (n=3). In some aspects, symbol offset 2 is based at least in part on one or more symbols in slots 1 and 2 being punctured or invalid for uplink transmission. For example, a minimum symbol offset K=2 can be configured or indicated. However, since there is only one orphan symbol for the third repetition (n=2) in Slot 1, the third repetition may be postponed. Further, because the first two symbols in Slot 2 is invalid, the third repetition starts at the symbol index 2 of Slot 2. In this case, the symbols offset between the second and third repetitions becomes K=5 instead of K=2 in determining for the PUSCH repetitions. In another example, the last symbol (symbol index 5) of the third PUSCH repetition may be punctured for some reason, the symbol offset between the third and fourth repetitions becomes K=1 instead of 2 in determining for the PUSCH repetitions.

As further illustrated in FIG. 3C, the UE 120 may transmit the plurality of repetitions in an alternating manner, in which the first repetition (n=0) is transmitted on a first beam or a first antenna panel, the second repetition (n=1) is transmitted on a second beam or a second antenna panel, the third repetition (n=2) is transmitted on the first beam or the first antenna panel, and the fourth repetition (n=3) is transmitted on the second beam or the second antenna panel.

Because the symbol offsets for a plurality of repetitions of PUSCH transmission are variable or flexible, the UE 120 may determine a respective starting slot and starting symbol, and a respective ending slot and ending symbol, for each of repetition n=0 through n=3 based at least in part on Equations 5-8 described above. Accordingly, the UE 120 may determine the starting slot for the first repetition (n=0) as slot 1, and may determine the starting symbol for the first repetition (n=0) as symbol index 1 in slot 1. The UE 120 may determine the ending slot for the first repetition (n=0) as slot 1, and may determine the ending symbol for the first repetition (n=0) as symbol index 4 in slot 1. The UE 120 may determine the starting slot for the second repetition (n=1) as slot 1, and may determine the starting symbol for the second repetition (n=1) as symbol index 7 in slot 1. The UE 120 may determine the ending slot for the second repetition (n=1) as slot 1, and may determine the ending symbol for the second repetition (n=1) as symbol index 10 in slot 1.

The UE 120 may determine the starting slot for the third repetition (n=2) as slot 2, and may determine the starting symbol for the third repetition (n=2) as symbol index 2 in slot 2. The UE 120 may determine the ending slot for the third repetition (n=2) as slot 2, and may determine the ending symbol for the third repetition (n=2) as symbol index 5 in slot 2. The UE 120 may determine the starting slot for the fourth repetition (n=3) as slot 2, and may determine the starting symbol for the fourth repetition (n=3) as symbol index 7 in slot 2. The UE 120 may determine the ending slot for the fourth repetition (n=3) as slot 2, and may determine the ending symbol for the fourth repetition (n=3) as symbol index 10 in slot 2.

In this way, the UE 120 may determine a respective starting symbol and a respective ending symbol for each repetition of a PUSCH transmission based at least in part on a symbol offset between repetitions of the PUSCH transmission. The symbol offset may be the same for all repetitions or may be variable and configurable for each repetition. In this way, the symbol offset(s) provide the UE 120 with sufficient time to perform beam switching or antenna panel switching between repetitions of the PUSCH transmission, which increases the reliability of transmitting the PUSCH transmission with repetition, decreases the likelihood of retransmissions for the PUSCH transmission, and/or the like.

Although the examples are given to PUSCH repetitions, the above methods are also applicable to the PUCCH or SRS repetitions, where the values of S, L, $K_s$ and the number of repetitions may be configured or indicated for PUCCH or SRS repetitions which can be different from the way for PUSCH repetitions.

As indicated above, FIGS. 3A-3C is provided as one or more examples. Other examples may differ from what is described with respect to FIGS. 3A-3C.

Figure 4:
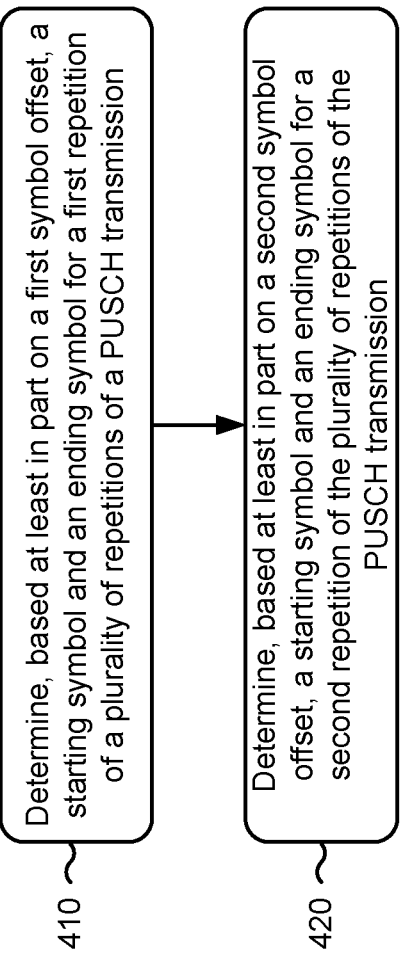
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., a UE 120 illustrated and described in connection with one or more of FIGS. 1, 2, and/or 3A-3C) performs operations associated with transmitting PUSCH repetitions based at least in part on a symbol offset.

As shown in FIG. 4, in some aspects, process 400 may include determining, based at least in part on a first symbol offset, a starting symbol and an ending symbol for a first repetition of a plurality of repetitions of a PUSCH transmission (block 410). For example, the UE (e.g., using receive processor 258, transmit processor 264, controller/processor 280, memory 282, and/or the like) may determine, based at least in part on a first symbol offset, a starting symbol and an ending symbol for a first repetition of a plurality of repetitions of a PUSCH transmission, as described above.

As further shown in FIG. 4, in some aspects, process 400 may include determining, based at least in part on a second symbol offset, a starting symbol and an ending symbol for a second repetition of the plurality of repetitions of the PUSCH transmission (block 420). For example, the UE (e.g., using receive processor 258, transmit processor 264, controller/processor 280, memory 282, and/or the like) may determine, based at least in part on a second symbol offset, a starting symbol and an ending symbol for a second repetition of the plurality of repetitions of the PUSCH transmission, as described above.

Process 400 may include additional aspects, such as any single aspect or any combination of aspects described below and/or in connection with one or more other processes described elsewhere herein.

In a first aspect, determining the starting symbol and the ending symbol for the first repetition comprises determining the starting symbol and the ending symbol for the first repetition based at least in part on a duration of the first repetition, and determining the starting symbol and the ending symbol for the second repetition comprises determining the starting symbol and the ending symbol for the second repetition based at least in part on a duration of the second repetition. In a second aspect, alone or in combination with the first aspect, the first symbol offset and the second symbol offset are a same symbol offset value, and the symbol offset value specifies a fixed quantity of symbols for the plurality of repetitions of the PUSCH transmission. In a third aspect, alone or in combination with one or more of the first and second aspects, the first symbol offset and the second symbol offset are respective variable symbol offset values.

In a fourth aspect, alone or in combination with one or more of the first through third aspects, the respective variable symbol offset values are indicated in a downlink communication that schedules the PUSCH transmission. In a fifth aspect, alone or in combination with one or more of the first through fourth aspects, determining the starting symbol and the ending symbol for the first repetition comprises determining a starting slot for the first repetition; determining the starting symbol for the first repetition within the starting slot for the first repetition; determining an ending slot for the first repetition, and determining the ending symbol for the first repetition within the ending slot for the first repetition. In a sixth aspect, alone or in combination with one or more of the first through fifth aspects, determining the starting slot for the first repetition comprises determining the starting slot for the first repetition based at least in part on a nominal duration of the first repetition, a starting slot for the PUSCH transmission, a quantity of symbols included in the starting slot for the first repetition, a starting symbol for the PUSCH transmission in the starting slot for the PUSCH transmission, the first symbol offset, and a repetition index associated with the first repetition.

In a seventh aspect, alone or in combination with one or more of the first through sixth aspects, determining the starting slot for the first repetition comprises determining the starting slot for the first repetition based at least in part on a nominal duration of the first repetition, a starting slot for the PUSCH transmission, a quantity of symbols per slot, a starting symbol for the PUSCH transmission in the starting slot for the PUSCH transmission, the first symbol offset, and a repetition index associated with the first repetition. In an eighth aspect, alone or in combination with one or more of the first through seventh aspects, determining the starting symbol for the first repetition in the starting slot for the first repetition comprises determining the starting symbol for the first repetition in the starting slot for the first repetition based at least in part on a nominal duration of the first repetition, a starting slot for the PUSCH transmission, a quantity of symbols per slot, a starting symbol for the PUSCH transmission in the starting slot for the PUSCH transmission, the first symbol offset, and a repetition index associated with the first repetition.

In a ninth aspect, alone or in combination with one or more of the first through eighth aspects, determining the ending slot for the first repetition comprises determining the ending slot for the first repetition based at least in part on a nominal duration of the first repetition, a starting slot for the PUSCH transmission, a quantity of symbols per slot, a starting symbol for the PUSCH transmission in the starting slot for the PUSCH transmission, the first symbol offset, and a repetition index associated with the first repetition. In a tenth aspect, alone or in combination with one or more of the first through ninth aspects, determining the ending symbol for the first repetition in the ending slot for the first repetition comprises determining the ending symbol for the first repetition in the ending slot for the first repetition based at least in part on a nominal duration of each of the plurality of repetitions, a starting slot for the PUSCH transmission, a quantity of symbols per slot, a starting symbol for the PUSCH transmission in the starting slot for the PUSCH transmission, the first symbol offset, and a repetition index associated with the first repetition.

In an eleventh aspect, alone or in combination with one or more of the first through tenth aspects, determining the starting symbol and the ending symbol for the second repetition comprises determining a starting slot for the second repetition; determining the starting symbol for the second repetition within the starting slot for the second repetition; determining an ending slot for the second repetition, and determining the ending symbol for the second repetition within the ending slot for the second repetition. In a twelfth aspect, alone or in combination with one or more of the first through eleventh aspects, determining the starting slot for the second repetition comprises determining the starting slot for the second repetition based at least in part on a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

In a thirteenth aspect, alone or in combination with one or more of the first through twelfth aspects, determining the starting symbol for the second repetition in the starting slot for the second repetition comprises determining the starting symbol for the second repetition in the starting slot for the second repetition based at least in part on a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition. In a fourteenth aspect, alone or in combination with one or more of the first through thirteenth aspects, determining the starting slot for the second repetition comprises determining the starting slot for the second repetition based at least in part on a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

In a fifteenth aspect, alone or in combination with one or more of the first through fourteenth aspects, determining the starting symbol for the second repetition in the starting slot for the second repetition comprises determining the starting symbol for the second repetition in the starting slot for the second repetition based at least in part on a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

transmitting a first repetition of a plurality of repetitions of a physical uplink shared channel (PUSCH) transmission, based at least in part on a first symbol offset, a starting symbol and an ending symbol for the first repetition of the plurality of repetitions of the PUSCH transmission, wherein the first symbol offset comprises a first quantity of one or more unused symbols and wherein the first symbol offset is based at least in part on a beam switching associated with the PUSCH transmission; and transmitting a second repetition of the plurality of repetitions of the PUSCH transmission, based at least in part on a second symbol offset, a starting symbol and an ending symbol for the second repetition of the plurality of repetitions of the PUSCH transmission, wherein the second symbol offset comprises a second quantity of one or more unused symbols and wherein the second symbol offset is based at least in part on the beam switching associated with the PUSCH transmission.

2. The method of claim 1, further comprising:

determining the starting symbol and the ending symbol for the first repetition based at least in part on a duration of the first repetition; and determining the starting symbol and the ending symbol for the second repetition based at least in part on a duration of the second repetition.

3. The method of claim 1, wherein the first symbol offset and the second symbol offset are a same symbol offset value; and wherein the symbol offset value specifies a fixed quantity of symbols for the plurality of repetitions of the PUSCH transmission.

4. The method of claim 1, wherein the first symbol offset and the second symbol offset are respective variable symbol offset values.

5. The method of claim 4, wherein the respective variable symbol offset values are indicated in a downlink communication that schedules the PUSCH transmission.

6. The method of claim 1, further comprising:

determining a starting slot for the first repetition;

determining the starting symbol for the first repetition within the starting slot for the first repetition;

determining an ending slot for the first repetition; and determining the ending symbol for the first repetition within the ending slot for the first repetition.

7. The method of claim 6, wherein determining the starting slot for the first repetition comprises:

determining the starting slot for the first repetition based at least in part on:

a nominal duration of the first repetition, a starting slot for the PUSCH transmission, a quantity of symbols included in the starting slot for the first repetition, a starting symbol for the PUSCH transmission in the starting slot for the PUSCH transmission, the first symbol offset, and a repetition index associated with the first repetition.

8. The method of claim 6, wherein determining the starting symbol for the first repetition within the starting slot for the first repetition comprises:

determining the starting symbol for the first repetition in the starting slot for the first repetition based at least in part on:

a nominal duration of the first repetition, a starting slot for the PUSCH transmission, a quantity of symbols per slot, a starting symbol for the PUSCH transmission in the starting slot for the PUSCH transmission, the first symbol offset, and a repetition index associated with the first repetition.

9. The method of claim 6, wherein determining the ending slot for the first repetition comprises:

determining the ending slot for the first repetition based at least in part on:

a nominal duration of the first repetition, a starting slot for the PUSCH transmission, a quantity of symbols per slot, a starting symbol for the PUSCH transmission in the starting slot for the PUSCH transmission, the first symbol offset, and a repetition index associated with the first repetition.

10. The method of claim 6, wherein determining the ending symbol for the first repetition in the ending slot for the first repetition comprises:

determining the ending symbol for the first repetition within the ending slot for the first repetition based at least in part on:

a nominal duration of each of the plurality of repetitions, a starting slot for the PUSCH transmission, a quantity of symbols per slot, a starting symbol for the PUSCH transmission in the starting slot for the PUSCH transmission, the first symbol offset, and a repetition index associated with the first repetition.

11. The method of claim 1, further comprising:

determining a starting slot for the second repetition;

determining the starting symbol for the second repetition within the starting slot for the second repetition;

determining an ending slot for the second repetition; and determining the ending symbol for the second repetition within the ending slot for the second repetition.

12. The method of claim 11, wherein determining the starting slot for the second repetition comprises:

determining the starting slot for the second repetition based at least in part on:

a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

13. The method of claim 11, wherein determining the starting symbol for the second repetition within the starting slot for the second repetition comprises:

determining the starting symbol for the second repetition in the starting slot for the second repetition based at least in part on:

a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

14. The method of claim 11, wherein determining the ending symbol for the second repetition within the ending slot for the second repetition comprises:

determining the starting symbol for the second repetition in the starting slot for the second repetition based at least in part on:

a nominal duration of the second repetition, a starting slot for the PUSCH transmission, a quantity of symbols per slot, a starting symbol for the PUSCH transmission in the starting slot for the PUSCH transmission, an accumulation of the first symbol offset and the second symbol offset, and a repetition index associated with the second repetition.

15. A user equipment (UE) for wireless communication, comprising:

one or more memories; and one or more processors operatively coupled to the one or more memories, the memory and the one or more processors configured to:

transmit a first repetition of a plurality of repetitions of a physical uplink shared channel (PUSCH) transmission, based at least in part on a first symbol offset, a starting symbol and an ending symbol for the first repetition of the plurality of repetitions of the PUSCH transmission, wherein the first symbol offset comprises a first quantity of one or more unused symbols and wherein the first symbol offset is based at least in part on a beam switching associated with the PUSCH transmission; and transmit a second repetition of the plurality of repetitions of the PUSCH transmission, based at least in part on a second symbol offset, a starting symbol and an ending symbol for the second repetition of the plurality of repetitions of the PUSCH transmission, wherein the second symbol offset comprises a second quantity of one or more unused symbols and wherein the second symbol offset is based at least in part on the beam switching associated with the PUSCH transmission.

16. The UE of claim 15, wherein the first symbol offset and the second symbol offset are respective variable symbol offset values.

17. The UE of claim 16, wherein the respective variable symbol offset values are indicated in a downlink communication that schedules the PUSCH transmission.

18. A non-transitory computer-readable medium storing one or more instructions for wireless communication, the one or more instructions comprising:

one or more instructions that, when executed by one or more processors of a user equipment (UE), cause the one or more processors to:

transmit a first repetition of a plurality of repetitions of a physical uplink shared channel (PUSCH) transmission, based at least in part on a first symbol offset, a starting symbol and an ending symbol for the first repetition of the plurality of repetitions of the PUSCH transmission, wherein the first symbol offset comprises a first quantity of one or more unused symbols and wherein the first symbol offset is based at least in part on a beam switching associated with the PUSCH transmission; and transmit a second repetition of the plurality of repetitions of the PUSCH transmission, based at least in part on a second symbol offset, a starting symbol and an ending symbol for the second repetition of the plurality of repetitions of the PUSCH transmission, wherein the second symbol offset comprises a second quantity of one or more unused symbols and wherein the second symbol offset is based at least in part on the beam switching associated with the PUSCH transmission.

19. An apparatus for wireless communication, comprising:

means for transmitting a first repetition of a plurality of repetitions of a physical uplink shared channel (PUSCH) transmission, based at least in part on a first symbol offset, a starting symbol and an ending symbol for the first repetition of the plurality of repetitions of the PUSCH transmission, wherein the first symbol offset comprises a first quantity of one or more unused symbols and wherein the first symbol offset is based at least in part on a beam switching associated with the PUSCH transmission; and means for transmitting a second repetition of the plurality of repetitions of the PUSCH transmission, based at least in part on a second symbol offset, a starting symbol and an ending symbol for the second repetition of the plurality of repetitions of the PUSCH transmission, wherein the second symbol offset comprises a second quantity of one or more unused symbols and wherein the second symbol offset is based at least in part on the beam switching associated with the PUSCH transmission.

* * * * *